United States Patent
Hemphill (10) Patent No.: US 10,581,672 B2
(45) Date of Patent: Mar. 3, 2020

(54) NETWORK ACCESS SYSTEM CONFIGURATION

(71) Applicant: WigWag Inc., Austin, TX (US)

(72) Inventor: Thomas E. Hemphill, Austin, TX (US)

(73) Assignee: WigWag Inc., Austin, TX (US)

( * ) Notice: Subject to any disclaimer, the term of this patent is extended or adjusted under 35 U.S.C. 154(b) by 44 days.

(21) Appl. No.: 14/970,802

(22) Filed: Dec. 16, 2015

(65) Prior Publication Data

US 2017/0181056 A1 Jun. 22, 2017

(51) Int. Cl.
| | |
|---|---|
| H04W 48/04 | (2009.01) |
| H04L 12/24 | (2006.01) |
| H04L 29/06 | (2006.01) |
| H04W 4/70 | (2018.01) |
| G06F 21/44 | (2013.01) |
| H04W 12/00 | (2009.01) |
| H04W 12/08 | (2009.01) |
| H04L 29/08 | (2006.01) |
| H04W 84/12 | (2009.01) |

(52) U.S. Cl.
CPC ......... *H04L 41/0806* (2013.01); *G06F 21/44* (2013.01); *H04L 41/0886* (2013.01); *H04L 63/00* (2013.01); *H04L 63/101* (2013.01); *H04L 63/102* (2013.01); *H04W 4/70* (2018.02); *H04W 12/00* (2013.01); *H04W 12/08* (2013.01); *H04L 67/125* (2013.01); *H04W 12/00512* (2019.01); *H04W 84/12* (2013.01)

(58) Field of Classification Search
CPC combination set(s) only.
See application file for complete search history.

(56) References Cited

U.S. PATENT DOCUMENTS

2016/0182524 A1* 6/2016 Khosravi ............ H04L 63/105
726/1

* cited by examiner

*Primary Examiner* — Kouroush Mohebbi
(74) *Attorney, Agent, or Firm* — Berkeley Law & Technology Group, LLP (57) ABSTRACT

Methods and apparatus for configuring a network access system include detecting, at a network entity, an electronic device associated with a first class of devices. The methods and apparatus further include selecting a device controller from a set of device controllers based at least in part on detecting the electronic device. In some aspects, the device controller is associated with the electronic device and manages communication between the electronic device and a remote host device according to one or more communication services. In addition, the methods and apparatus include activating the one or more communication services in response to selecting the device controller from the set of device controllers. Additionally, the methods and apparatus include configuring one or more network access characteristics of a network access system at the network entity based on the one or more communication services.

23 Claims, 8 Drawing Sheets

NETWORK ACCESS SYSTEM CONFIGURATION

BACKGROUND

The present disclosure generally relates to network communication, and more specifically to dynamically configuring a network access system.

In some communication systems, communication between one or more electronic devices may be facilitated using a network device such as, but not limited to a router. For example, a router may be a device that forwards data packets to various devices within a communication system employing one or more communication standards. In such communication systems, network security may be managed, at least in part, by a network access system such as, but not limited to, a firewall. For example, a firewall may monitor and control the incoming and outgoing network traffic. As such, a firewall may prevent unauthorized access to or from a communication system. However, firewalls may be static in operation and thus unable to provide a sufficient level of security to connected devices. Accordingly, it may be desirable to provide a device aware network access system that may be dynamically configurable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented below.

In some aspects, a method includes detecting, at a network entity, an electronic device associated with a first class of devices; selecting a device controller from a set of device controllers based at least in part on detecting the electronic device, wherein the device controller is associated with the electronic device and manages communication between the electronic device and a remote host device according to one or more communication services; activating the one or more communication services in response to selecting the device controller from the set of device controllers; and configuring a network access system at the network entity based on the one or more communication services.

In some aspects, a computer-readable storage medium comprising one or more programs for execution by one or more processors of an electronic device, the one or more programs including instructions which, when executed by the one or more processors, cause the electronic device to: detect an electronic device associated with a first class of devices; select a device controller from a set of device controllers based at least in part on detecting the electronic device, wherein the device controller is associated with the electronic device and manages communication between the electronic device and a remote host device according to one or more communication services; activate the one or more communication services in response to selecting the device controller from the set of device controllers; and configure a network access system at the network entity based on the one or more communication services.

In some aspects, an electronic apparatus comprising: one or more processors; memory; and one or more programs stored in the memory, the one or more programs including instructions for: detecting an electronic device associated with a first class of devices; selecting a device controller from a set of device controllers based at least in part on detecting the electronic device, wherein the device controller is associated with the electronic device and manages communication between the electronic device and a remote host device according to one or more communication services; activating the one or more communication services in response to selecting the device controller from the set of device controllers; and configuring a network access system at the network entity based on the one or more communication services.

In some aspects, an electronic apparatus comprising: a memory unit; and a processing unit connected to the memory unit, wherein the processing unit is configured to: detect an electronic device associated with a first class of devices; select a device controller from a set of device controllers based at least in part on detecting the electronic device, wherein the device controller is associated with the electronic device and manages communication between the electronic device and a remote host device according to one or more communication services; activate the one or more communication services in response to selecting the device controller from the set of device controllers; and configure a network access system at the network entity based on the one or more communication services.

In some aspects, an electronic apparatus comprising: means for detecting an electronic device associated with a first class of devices; means for selecting a device controller from a set of device controllers based at least in part on detecting the electronic device, wherein the device controller is associated with the electronic device and manages communication between the electronic device and a remote host device according to one or more communication services; means for activating the one or more communication services in response to selecting the device controller from the set of device controllers; and means for configuring a network access system at the network entity based on the one or more communication services.

DESCRIPTION OF THE FIGURES

For a better understanding of the various described aspects, reference should be made to the description below, in conjunction with the following figures in which like reference numerals refer to corresponding parts throughout the figures.

DETAILED DESCRIPTION

Various aspects of the systems, apparatuses, and methods are described more fully hereinafter with reference to the accompanying figures. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the systems, apparatuses, and methods disclosed herein, whether implemented independently of, or combined with, any other aspect described herein. For example, an apparatus may be implemented or a method may be practiced using any number of the aspects set forth herein. In addition, the scope of the present aspects is intended to cover such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the aspects are mentioned, the scope of the disclosure is not intended to be limited to particular benefits, uses, or objectives. Rather, aspects of the disclosure are intended to be broadly applicable to different communication technologies, system configurations, networks, and transmission protocols, some of which are illustrated by way of example in the figures and in the following description of the aspects. The detailed description and figures are merely illustrative of the disclosure rather than limiting, the scope of the disclosure being defined by the appended claims and equivalents thereof.

The present aspects generally relate to configuring a network access system. Specifically, the present aspects may automatically and/or dynamically configure a network access system such as, but not limited to, a firewall at a network entity according to or based on one or more detected automation devices. For example, a network access system (e.g., firewall) of a network entity may be initially established or provisioned according a set of first electronic devices. As such, the network access system (e.g., firewall) may authorize access or block unauthorized access while permitting outward communication. Further, a second set of electronic devices classified as automation devices operating according to a set of communication parameters (e.g., rules or standards) different from the first set of electronic devices may be detected by the network entity. These automation devices in turn may transmit and receive data packets via network entity.

However, the network access system (e.g., firewall) permits or denies access to or from the automation devices based on same communication parameters used for the first set of electronic devices. Such an implementation may leave the network vulnerable as a number of different protocols or layers by which access to or from the network may be made via the automation device that is unaccounted for. With the network access system unable to establish or configure accordingly, unauthorized access may be made to the network.

For example, a network entity (e.g., router) may transmit and receive Internet Protocol (IP) data packets between one or more networks in accordance with one or more communication standards or protocols. A communications protocol may be a system of rules that allow two or more entities of a communications system to transmit information via any kind of variation of a physical quantity. However, a network entity may not make determinations based on content of the data packet beyond the network or transport layer (e.g., layer 3 and 4 in the Open Systems Interconnection (OSI) network model). In some instances, a network entity may perform deep packet inspection to look at specific protocols for some signature representing a specific risk. For instance, a Simple Mail Transfer Protocol (SMTP) gateway may inspect or search for viruses in email traffic.

Nonetheless, monitoring and determining whether to permit access to a network may be specific to only a number of protocols. This is due in part to a development and maintaining of homogeneity in protocol structure and operation. Yet, automation devices may operate outside of the typical protocol structure. That is, automation devices may trigger a fading of protocol homogeneity and conversely to a more heterogeneous structure of additional protocols. Accordingly, a network access system (e.g., firewall) of a network entity (e.g., router) may expand its access monitoring and/or determinations to the additional protocols or layers.

In particular, communication with automation devices may involve protocols or layers above data packets at Layer 3. For example, some of these communication standards may include, but are not limited to, ZigBee, Bluetooth, Z-Wave, 6LoWPAN, and/or Thread. Some of the aforementioned communication protocols may operate according to or otherwise include an external computer or 'hub' to bridge them to the Internet along with a user application that works with that bridge. That is, their respective communication protocol does not operate solely according to or solely access the Internet Protocol. This may result in numerous hubs being established at a location (e.g., home or office) as automation devices are added. Furthermore, the security of each of these hubs may be separately controlled resulting in a disjointed automation device security policy lacking cohesion and uniformity.

Additionally, it may be desirable for a network access system (e.g., firewall) to monitor and control the incoming and outgoing network traffic based on the hardware and software characteristics of automation devices. For instance, automation devices may be designed and programmed with a distinct set of constraints than traditional "fatter" clients or devices on a network, such as smartphones, tablets and personal computers. Constraints such as comparatively less amounts of random access memory (RAM) and permanent storage like flash memory, limit the sophistication of the software on such a device. In turn, automation devices may be upgraded less often than larger electronic devices. As such, automation devices may be prone to having security holes, and hence more stringent network access (e.g., firewalling) control may be desirable.

Further, the existing network security patterns of a network access system do not work effectively with automation devices. As an example, a network access system of some network entities (e.g., router devices) may implement security according to Network Address Translation (NAT). NAT may conceal vulnerable laptops and PCs in the home behind a single address which allows outbound communications, but not inbound requests. However, in a network including one or more automation devices (e.g., sensor devices and/or controllable devices), these devices may desire access to and from the Internet, which NAT may prevent. Additionally, some network entities employing NAT may allow all or nearly all outbound data packets out of the network. As a result, in the event access to the network is obtained by an unauthorized entity, an automation device may send data to the unauthorized entity (e.g., server). That is, even in such a case where unauthorized access is obtained to the network, the automation device is nonetheless not prevented (e.g., via a firewall) from sending data to the unauthorized entity.

Accordingly, in some aspects, the present methods and apparatus may provide an efficient and effective solution, as compared to current solutions, to provide a network entity (e.g., router) having a network access system (e.g., firewall) that dynamically configures network access according to detected automated devices. Specifically, the present methods and apparatus may detect an electronic device associated with or belonging to a first class of devices (e.g., automation devices), and configure a network access system (e.g., firewall) at the network entity (e.g., router) based on the one or more communication services associated with a device controller.

Figure 1:
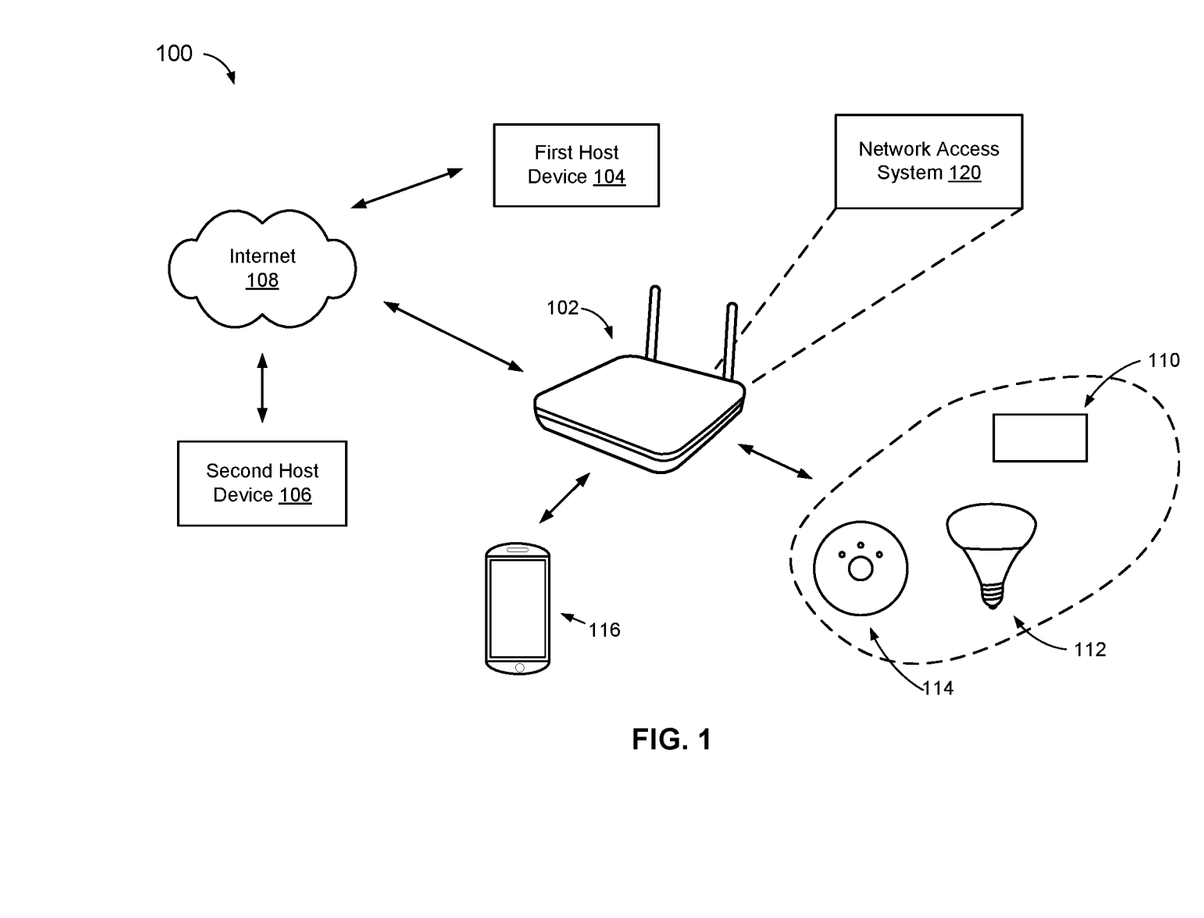
FIG. 1 illustrates a schematic diagram of a communication system including a network entity and one or more electronic devices in accordance with some aspects of the present disclosure.

Referring to FIG. 1, a schematic diagram of a communication system 100 is illustrated in accordance with some aspects of the present disclosure. Communication system 100 may include network entity 102, which may be configured to transmit and receive data packets to various devices within communication system 100 employing one or more communication standards (e.g., WiFi). In some aspects, communication system 100 may include one or more automation devices (e.g., first automation device 110, second automation device 112, and third automation device 114), as well as electronic device 116. In some aspects, an automation device may be a device embedded with electronics, software, sensors, and/or network connectivity, which may enable the device to collect and exchange data. As such, one or more automation devices 110, 112, and/or 114 and/or electronic device 116 may connect to network entity 102 via a compliant wireless link or connection to obtain general connectivity to Internet 108 or to other wide area networks.

Further, communication system 100 includes first host device 104 and second host device 106, each of which may be configured to store and communicate data with corresponding automation devices 110, 112, 114, and/or electronic device 116. For example, first host device 104 may include data specific to or otherwise associated with first automation device 110. In some aspects, first host device 104 and second host device 106 may be accessed via Internet 108 to provide device-specific data or information to automation devices 110, 112, 114, and/or electronic device 116.

In an example, first automation device 110 may communicate with corresponding first host device 104 (e.g., via network entity 102 and Internet 108) to transmit and receive data specific to the operation and usage of first automation device 110. As such, a first hub or network may be established including first automation device 110 and first host device 104. Additionally, communication with a corresponding host device may be done so according to one or more communication standards or protocols. For instance, the first hub or network may communicate according to a first communication standard or protocol (e.g., Bluetooth).

Similarly, second automation device 112 and/or third automation device 114 may communicate with corresponding second host device 106 (e.g., via network entity 102 and Internet 108) to transmit and receive data specific to the operation and usage of second automation device 112 and/or third automation device 114. As a result, a second hub or network may be established. Further, the second hub or network may communicate according to a second communication standard or protocol (e.g., ZigBee), which may be the same as or distinct from the first communication standard or protocol. In some aspects, first host device 104 and second host device 106 may each be one or more servers.

Communication system 100 may also include network access system 120, which may be configured to monitor and control incoming and outgoing network traffic based on one or more security parameters. In some aspects, network access system 120 may be or otherwise include a firewall. For example, network access system 120 may prevent unauthorized access to or from a private network of or at network entity 102. In some aspects, network access system 120 may be embodied within, performed at or by, or includes one or both of hardware or software. In some aspects, network access system 120 may be a network firewall, a network access point, and/or an industrial gateway or commercial base station.

In some aspects, an automation device (e.g., automation devices 110, 112, and/or 114) may be a device associated with or otherwise referred to as an Internet-of-Things device. For example, an automation device may be or otherwise include, but not limited to, a device (e.g., sensor and/or controller) used, for instance, in lighting systems, power control systems, Heating, Ventilation, and Air Conditioning (HVAC) systems, thermostats, security systems (e.g., cameras, motion detectors, and/or locks), garage doors, water systems (e.g., sprinklers, filtration, and/or pumps), a shading device, a wearable electronic sensor, a security device, an image capturing device, a recording device, an appliance, voice command device, or an entertainment device.

In some aspects, network entity 102 may be an access point configured to permit one or more automation devices and/or electronic devices to connect to a network (e.g., WLAN) using one or more communication standards (e.g., WiFi). The access point may connect, be part of, or otherwise include a router, which may be configured to forward or route data packets from one end or device (e.g., automation devices 110, 112, 114 and/or electronic device 116) to another end or device (e.g., first host device 104 and/or second host device 106). That is, in some aspects, the access point may be an integral component of the router. Further, for instance, the one or more communication standards may include, but are not limited to, 6lowPAN, ZIGBEE, DASH7, BLUETOOTH, IEEE 802.11 (WiFi), WiMAX, and/or a cellular standard (e.g., LTE). In some aspects, electronic device 116 and/or automation devices 110, 112, and/or 114 may also be used as an access point. Further, in some aspects, the access point may serve as a hub or base station for the network and a wireless device serves as a user of the network (e.g., WLAN).

In some aspects, electronic device 116 may include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In some aspects, communication system 100 may include or otherwise be part of a sensor network, hone sensor network, wireless sensor network, environmental sensor network, traffic sensor network, and/or surveillance sensor network.

Figure 2:
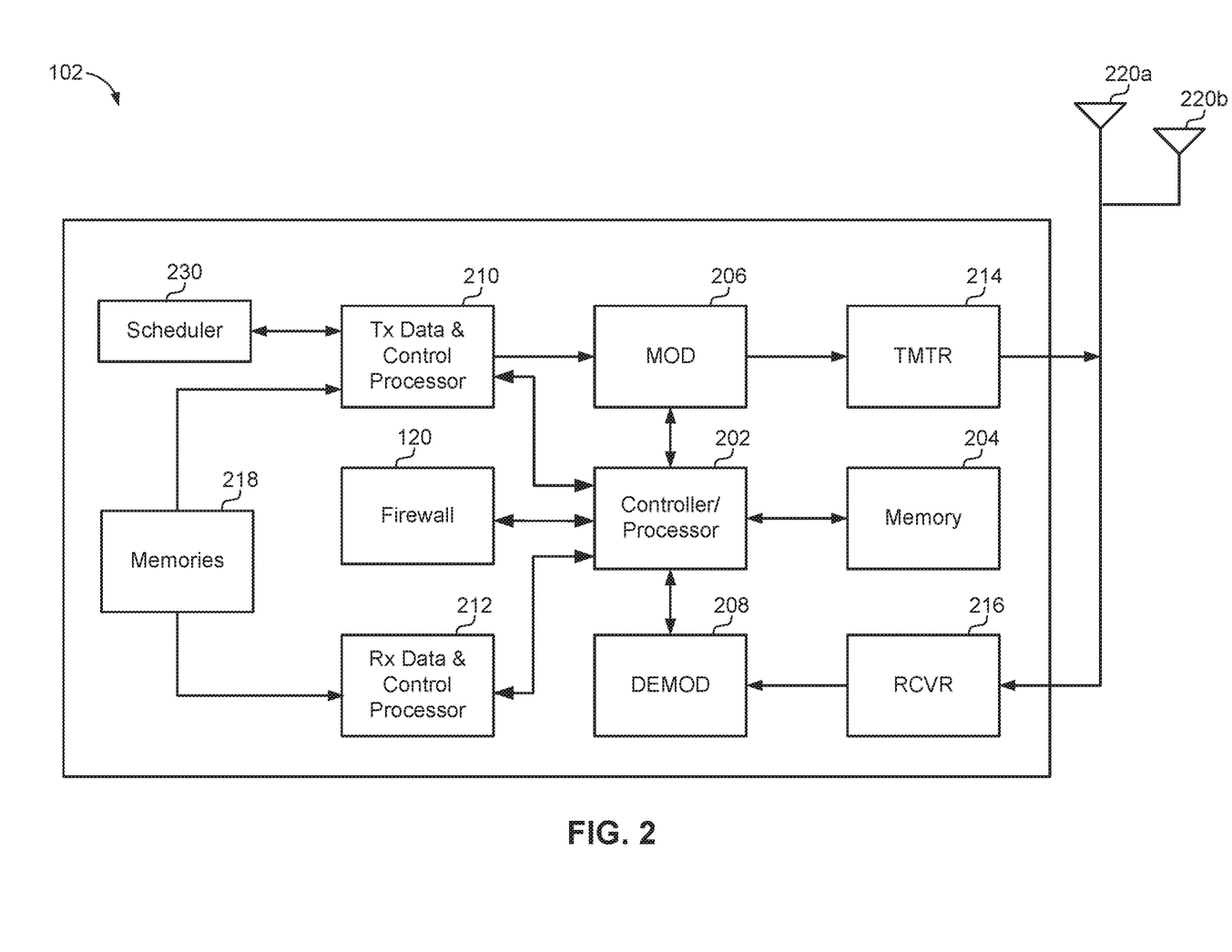
FIG. 2 illustrates a block diagram of a network entity in accordance with some aspects of the present disclosure.

FIG. 2 illustrates a block diagram of a design of network entity 102. At network entity 102, transmit (TX) data and control processor 210 may receive traffic data from a data source and/or control information from a controller/processor 202. Controller/processor 202 may process (e.g., format, encode, decode, and/or symbol map) the traffic data and control information and provide modulation symbols. Modulator (MOD) 206 may process the modulation symbols and provide output chips/data. Transmitter (TMTR) 214 may process (e.g., convert to analog, amplify, filter, and upconvert) the output data and generate a downlink signal, which may be transmitted via one or more antennas 220a or 220b.

Controller/processor 202 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

On the uplink, one or more automation devices 110, 112, and/or 114 (FIG. 1) and/or electronic device 116 (FIG. 1), may transmit data to network entity 102. At network entity 102, the uplink data or signals from the one or more automation devices 110, 112, and/or 114 (FIG. 1) and/or electronic device 116 (FIG. 1), may be received by one or more antennas 220a or 220b, conditioned by receiver 216, demodulated by a demodulator 208, and processed by RX data and control processor 212 to recover the data and control information sent by the one or more automation devices 110, 112, and/or 114 (FIG. 1) and/or electronic device 116 (FIG. 1). In some aspects, the processing for uplink transmission may be similar to or different from the processing for downlink transmission.

Controller/processor202 may direct the operation at network entity 102. Memories 218 may store data and program codes for the network entity 102. Scheduler 230 may schedule the one or more automation devices 110, 112, and/or 114 (FIG. 1) and/or electronic device 116 (FIG. 1), for downlink and/or uplink transmission and may provide assignments of system resources.

Although a number of separate components are illustrated in FIG. 2, those of skill in the art will recognize that one or more of the components may be combined or commonly implemented. Further, each of the components illustrated in FIG. 2 may be implemented using a plurality of separate elements.

In some aspects, memory 204 may be or otherwise take the form of one or more computer-readable storage mediums. The computer-readable storage mediums may be tangible and non-transitory. The memory may include high-speed random access memory and may also include non-volatile memory, such as one or more magnetic disk storage devices, flash memory devices, or other non-volatile solid-state memory devices. A corresponding memory controller may control access to memory by other components of network entity 102 and/or one or more modules and/or components of network entity 102. Executable instructions for performing these functions are, optionally, included in a transitory computer-readable storage medium or other computer program product configured for execution by one or more processors.

Further, memory 204 of network entity 102 and/or each one of the modules and/or components of network entity 102 may be a non-transitory computer-readable storage medium, for storing computer-executable instructions, which, when executed by one or more computer processors, for example, can cause the computer processors to perform the techniques described herein. The computer executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In some aspects, a "non-transitory computer-readable storage medium" may be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Figure 3:
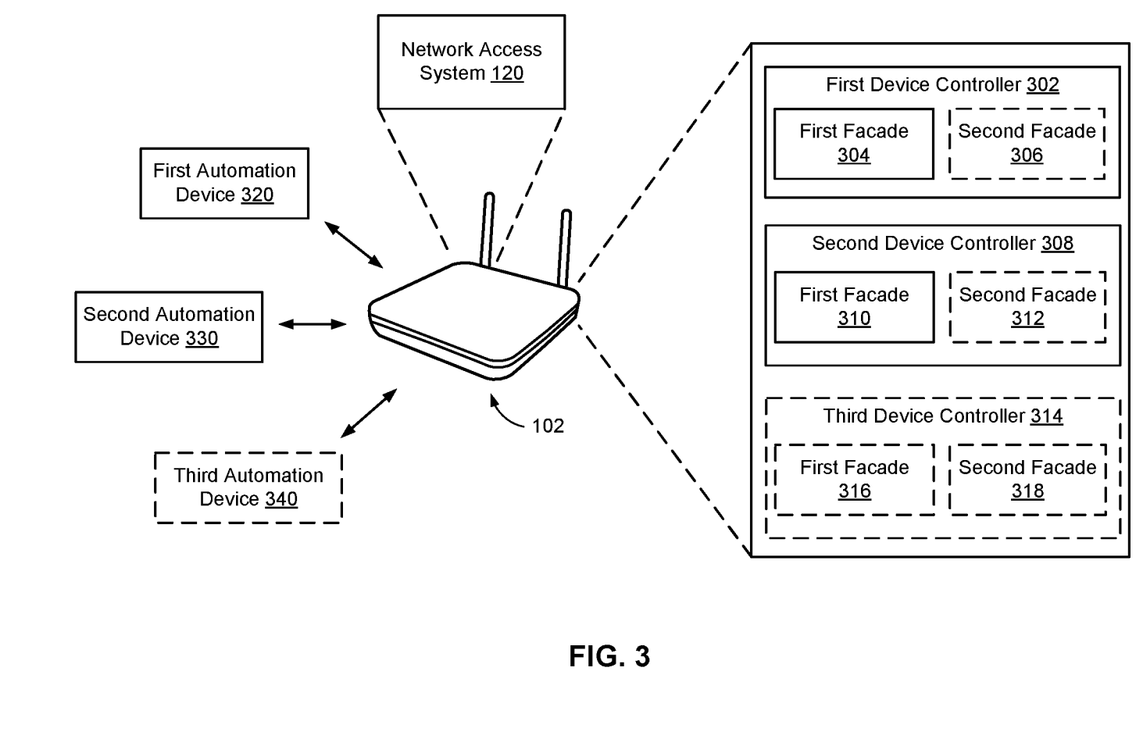
FIG. 3 illustrates a network entity including one or more device controllers in accordance with some aspects of the present disclosure.

FIG. 3 illustrates network entity 102 including one or more device controllers in accordance with some aspects of the present disclosure. As shown in FIG. 3, network entity 102 may communicate with one or more automation devices (e.g., first automation device 320, second automation device 330, and/or third automation device 340). In some aspects, one or more of first automation device 320, second automation device 330, and/or third automation device 340 may be the same as or similar to automation devices 110, 112, and/or 114 (FIG. 1).

For instance, network entity 102 may be configured to receive, generate, and/or store one or more device controllers (e.g., first device controller 302, second device controller 308, and/or third device controller 314) associated with respective automation devices. Specifically, the one or more device controllers 302, 308, and/or 314 of network entity 102 enable network entity 102 to dynamically configure network access system 120 (e.g., firewall) so as to prevent unauthorized access to the network on which the devices reside. In particular, a device controller may be instantiated for an automation device on a network. Further, a device controller may permit controlling and/or listening to an automation device's capabilities. The device controller can also contain security parameters, services, and/or rules for an automation device.

For example, the one or more device controllers 302, 308, and/or 314 may configure network access system 120 to manage communication between one or more automation devices 320, 330, and/or 340 and respective host devices (e.g., first host device 104 and/or second host device 106, FIG. 1) based on defined parameters and/or rules in order to securely connect and communicate with the respective host device (e.g., first host device 104 and/or second host device 106, FIG. 1). In some aspects, the defined parameters and/or rules may be one or more communication services, or more specifically, one or more facades.

In particular, one or more device controllers 302, 308, 314 may manage operation between network entity 102 and the one or more devices (e.g., first device 320, second device 330, and/or third device 340) according to one or more communication services. Further, the one or more communication services may each be a facade or pattern of usage that specifies one or more of a device capability characteristics or one or more network services (e.g., ports, services, and/or network addresses).

For example, a device capability characteristic may include a representation of a defined device operation. In some non-limiting aspects, an automation device in the form of a programmable light switch device may include, a dimmable characteristic permitting or at least indicating that the automation device is capable of dimming, a switchable characteristic permitting or at least indicating that the automation device is capable of switching ON and OFF, and/or a has Wattage characteristic that permits or at least indicates the wattage by which automation device operates Alternatively, further aspects of the one or more network services are described herein with respect to FIG. 4. Thus, each device controller may include one or more facades that, upon execution or activation of a device controller, configures one or more network access characteristics (e.g., rules, parameters, definition, communication capability/operation) of network access system 120 (e.g., firewall).

For example, in some aspects, configuring the one or more network access characteristics of network access system 120 upon execution or activation of a respective device controller (e.g., and in turn, one or more facades) includes network entity 102 may adjust a whitelist or blacklist to include or exclude, respectively, one or both of the remote server service or the local access service. In some aspects, configuring the one or more network access characteristics includes restricting communication on one or more outbound ports at network entity 102.

Further, in some aspects, configuring the one or more network access characteristics of network access system 120 includes configuring or adjusting a first set of network access characteristics to a second set of network access characteristics based on the facades. For example, a first set of network access characteristics may be a first set of communication parameters (e.g., one or more ports, addresses, protocols) by which network access system 120 may permit one or more automation devices 320, 330, and/or 340 to operate or communicate thereto. However, the first set of communication parameters, which in some aspects, may be a port or address, may be adjusted to define or obtain a second set of network access characteristics based on the facades.

In some aspects, first device controller 302, which may include first facade 304 and optionally second facade 306, may be associated with or otherwise correspond to first automation device 320. Further, second device controller 308, which may include first facade 310 and optionally second facade 312. Additionally, an optional third device controller 314 may include first facade 316 and optionally second facade 318. In some aspects, first facade 304, second facade 306, first facade 310, second facade 312, first facade 316, and/or second facade 318 may each be or otherwise include one of a device capability characteristic or a network service.

Figure 4:
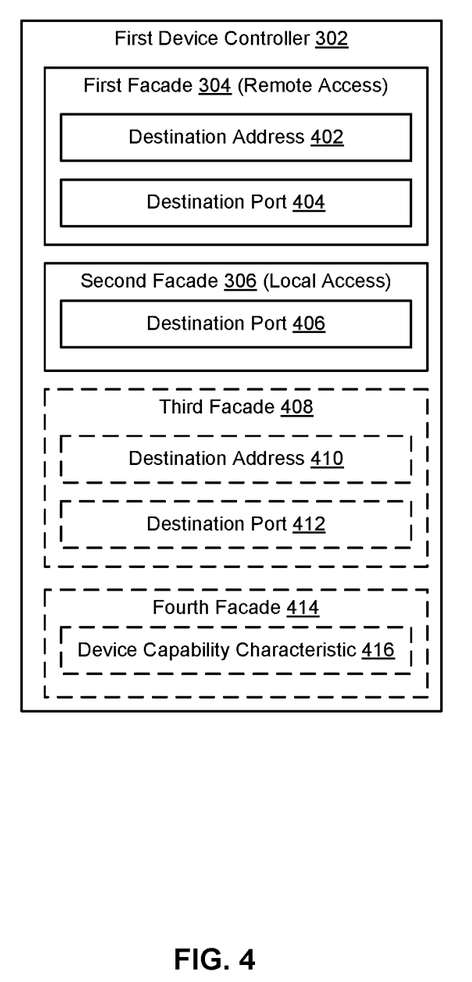
FIG. 4 illustrates an example of a device controller in accordance with some aspects of the present disclosure.

FIG. 4 illustrates an example of first device controller 302 in accordance with some aspects of the present disclosure. It should be understood that although first device controller 302 is shown, the aspects described herein with respect to FIG. 4 are not limited to first device controller 302. First device controller 302 may include first facade 304 and second facade 306 each including one or more communication services, and more specifically, one or more network services. In particular, first facade 304 and/or second facade 306 of device controller 302 includes or specifies one or both of a remote server service (e.g., cloud network service) of a respective automation device, and/or one or more local access service (e.g., firewall) parameters of a local application in the local access network. However, first device controller 302 may also include one or more additional facades, each of which may be one of a device capability characteristic or a network service.

In some aspects, first facade 304 may include or otherwise indicate one or more remote server services that specifies one or more hosts and/or ports of or used in accessing one or more remote host devices (e.g., first host device 104 and/or second host device 106, FIG. 1)). For example, the one or more remote host devices may be a cloud based service at a remote server associated with an automation device for which first device controller 302 enables secure communication between the aforementioned server and automation device.

Specifically, first facade 304 may include or otherwise indicate one or more remote access parameters or rules which, when implemented by network entity 102, may configure one or more network access characteristics of network access system 120 (FIGS. 1 and 3) to enable or otherwise permit secure connection to a specified remote host device (e.g., first host device 104, FIG. 1) associated with the automation device, and in turn prevent unauthorized access to the network on which the automation device resides. In some aspects, first facade 304 may include one or more destination addresses 402 (e.g., of one or both of remote host devices 104 or 106, FIG. 1) and one or more destination ports 404 (e.g., TCP ports and/or TCP/UDP ports of one or both of remote host devices 104 or 106, FIG. 1).

In some aspects, second facade 306 may include or otherwise specify one or more local access network communication characteristics of the network entity. That is, second facade 306 may indicate one or more local hosts, ports (e.g., destination port 406 at network entity 102), and/or protocols at network entity 102 (FIG. 1) that may be used in accessing one or both of a native application at the network or one or more host devices (e.g., first host device 104 and/or second host device 106, FIG. 1). For instance, second facade 306 may configure the one or more network access characteristics of network access system 120 (FIGS. 1 and 3) in such a way so as to permit communication within the local access network according to the one or more local hosts, ports, and/or protocols.

Further, first device controller 302 may include one or more additional facades. For instance, first device controller 302 can optionally include third facade 408, which may configure one or both of a remote access connection (e.g., with a remote host device) or a local access connection (e.g., at network entity 102, FIGS. 1 and 3). In particular, third facade can optionally be or otherwise include destination address 410 and/or destination port 412. Additionally, first device controller 302 can optionally include fourth facade 414, which may configure or enable a device-specific capability. Specifically, fourth facade may optionally be or otherwise include device capability characteristic 416.

As such, the one or more facades of device controller may configure network access system 120 (FIGS. 1 and 3) of network entity 102 (FIGS. 1-3) to control communication between one or more automation devices associated with the device controller and a remote host device. In particular, the one or more facades may configure one or more network access characteristics of network access system 120 (FIGS. 1 and 3). For example, configuring network access system 120 (FIGS. 1 and 3) includes adjusting (e.g., permitting, enabling, or restricting) outbound communication from the electronic device to the remote host device according to one or both of first facade 304 (e.g., remote server service) or second facade 306 (e.g., local access service). For instance, configuring network access system 120 (FIGS. 1 and 3) includes adjusting (e.g., permitting, enabling, or restricting) inbound communication from the remote host device to the electronic device according to one or both of first facade 304 (e.g., remote server service) or second facade 306 (e.g., local access service).

As such, the ability to specify network specifications by individual automation device, via one or more device controllers, allows network entity 102 (FIGS. 1-3) and its applications to provide much higher network security. For example, with respect to user configurability, a user may determine which automation devices should have Internet connectivity, and which should not. Such connectivity can also be configured to only work at a certain time or under certain circumstances. Further, with regard to lock down capabilities, as network entity 102 (FIGS. 1-3) can manage or control the automation device's access to specific remote host (cloud) services, the network entity 102 (FIGS. 1-3) (e.g., via a runtime) can lock down devices when appropriate, thereby preventing outside or outbound communication. The aforementioned may be beneficial when a security hole or other critical problem is reported with the given automation device.

Additionally, access to unpublished services may be prevented. For instance, in some cases, an automation device may be initially provisioned with a service or software operating on a port that is unpublished or not supported by the vender. Such ports may be weak points in security, allowing unauthorized access and use of the automation device. Accordingly, network access system 120 (FIGS. 1 and 3) may prevent unauthorized access on such unpublished ports.

Moreover, as network entity 102 (FIGS. 1-3) is aware of (e.g., stores) the local ports (e.g., via facades) an automation device application uses in communicating with a remote host device, network entity 102 (FIGS. 1-3), via network access system 120 (FIGS. 1 and 3) (e.g., firewall) may limit which clients or remote host devices may communicate with automation device. Such ability to limit or control communication may also be user configurable, providing the ability for a user to indicate who or what entity can control or configure a given automation device.

Figure 5:
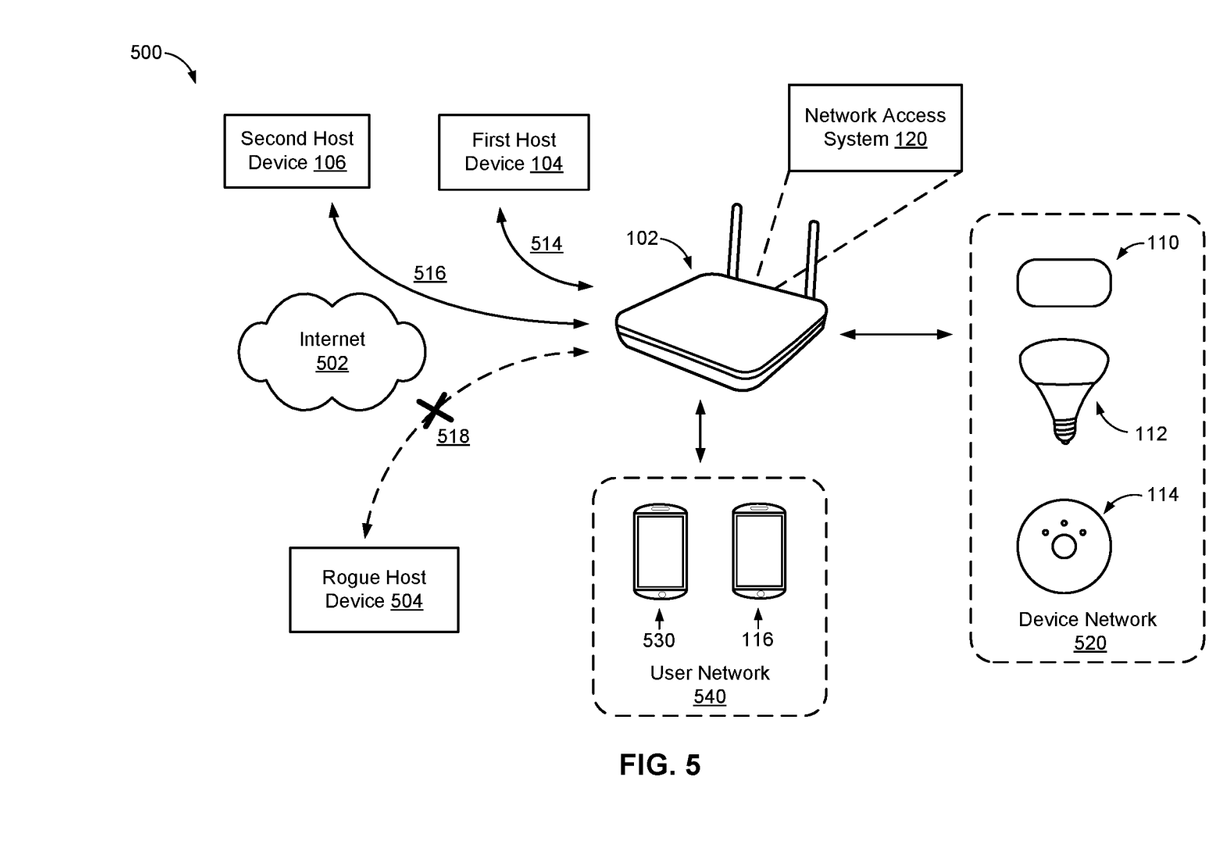
FIG. 5 illustrates a schematic diagram of a communication system in accordance with some aspects of the present disclosure.

FIG. 5 illustrates a schematic diagram of a communication system 500 in accordance with some aspects of the present disclosure. Communication system 500 may include network entity 102, which facilitates communication between one or more automation devices 110, 112, and/or 114, one or more electronic devices 116 and/or 530, and/or one or more host devices 104 and 106 using or in accordance with network access system 120 (e.g., firewall), and in some cases, via Internet 502.

Network entity 102 may be configured to prevent unauthorized access to one or more automation devices within the network (e.g., device LAN 520). In particular, network access system 120 of network entity 102 prevents a rogue client or device from temporarily accessing the network and controlling, configuring, and/or loading malware on one or more automation devices. Further, network access system 120 of network entity 102 prevents malware or rogue configurations to control the automation device by an intruder remotely or tunnel network data outside the network. Additionally, network access system 120 of network entity 102 controls outbound communication to unauthorized host devices or servers on the Internet 502.

Specifically, upon entering within range of a radio frequency field of network entity 102 (e.g., router), network entity 102 may detect one or more automation devices 110, 112, and/or 114. For example, network entity 102 may detect second automation device 112, which may, in a non-limiting instance, take the form of a lighting device. In some aspects, one or more services run on network entity 102, in network entity's 102 runtime environment, which, through one or more stages, can detect when a new automation device arrives on the network.

Further, one or more device controllers 302, 308, and/or 314 (FIGS. 3 and 4) associated with the automation device (e.g., second automation device 112) may be selected based on the detection results. For example, network entity 102 may select second device controller 308 (FIG. 3) associated with second automation device 112 based on detecting the same device within the network. The detection of second automation device 112 may be an initial detection or a subsequent or reentry detection following an exit from network (e.g., device LAN 520). In some aspects, selection of a corresponding device controller may be done so according to predetermined, pre-ran, or pre-executed detection result and subsequent association in a database at network entity 102.

Upon selecting one or more device controllers (e.g., second automation device 112) associated with the automation device (e.g., second automation device 112), the one or more device controllers (e.g., second automation device 112) including one or more communication services (e.g., facades) may be executed. Additionally, a secondary detection procedure may be performed upon execution of one or more device controllers (e.g., second automation device 112). For example, the secondary detection procedure includes querying the electronic device (e.g., second automation device 112) for one or more device capabilities (e.g., dimmable and/or switchable), a firmware version, communication services, and/or one or more service requests.

Further, network entity 102 (e.g., router) may be configured to implement one or more communication services or facades. In some aspects, a runtime environment at network entity 102 may detect which one or more communication services or facades are implemented. In addition, the runtime environment may also determine the type of device the device controller is to communicate with. Moreover, for instance, network entity 102 may authorize network access via one or more applications running within the runtime environment.

Following network authorization, network entity 102 may be configured to execute the one or more communication services of the selected device controller. In some aspects, when the device controller (e.g., second device controller 112) for the selected automation device implements a communication service or facade with network access and/or control capabilities, the execution can adjust the network access system 120 (e.g., firewall). Specifically, once the second device controller 302 (FIG. 3) is instantiated, it may execute at least two communication services for the second automation device 112 (e.g., lighting device) in order for it to securely connect with a respective remote host device (e.g., second host device 106), and thereby configuring network access system 120

For instance, network entity 102 may configure network access system 120 to adjust (e.g., permit) outbound communication from first automation device 110 to first host device 104 via communication channel or path 514 according to one or both of the remote server service or the local access service. Further, for example, network entity 102 may configure network access system 120 to adjust (e.g., permit) outbound communication from second automation device 112 to second host device 106 via communication channel or path 516 according to one or both of the remote server service or the local access service.

In some aspects, remote server service may request for or permit access for second automation device 112 to communicate with second host device 106 on certain or defined ports and/or destination addresses. Additionally, in some aspects, local access service may request for or permit access for trusted clients or device to communicate with second automation device 112 on certain ports of network entity 102. As such, an unauthorized attempt by or via a rogue host device 504 via communication channel or path 518 may be prevented as inbound and/or outbound communication on a configured number of ports and/or destination addresses is permitted.

Although the foregoing description has been made with reference to the second automation device 112, it should be understood that any one or more of the automation devices may be part of the network access system 120 configuration.

In addition, network entity 102 may segment or divide a network into two or more networks based on device capabilities or classifications, and allocate devices newly joined or detected accordingly. By segmenting the overall network, network entity 102 may shield certain devices (e.g., automation devices) from networks that may operate according to relatively less security (e.g., no use of device controllers).

For example, communication network 500 may include first local access network (LAN) 520 and second local access area network (LAN) 540. First LAN 520 may include first automation device 110, second automation device 112, and third automation device 114. Second LAN 540 may include first electronic device 116 and second electronic device 530. As such, first LAN 520 may operate according to different security or network access parameters as compared to second LAN 540. Accordingly, network access system 120 of network entity 102 may be configured to monitor and control access to first LAN 520 differently (e.g., according to the aspects described herein) as compared to second LAN 540.

In some aspects, first local access network 520 may operate or facilitate communication according to a first communication standard. Similarly, second local access network 540 may operate or facilitate communication according to a second communication standard. In some aspects, the first communication standard may be the same as or different from the second communication standard.

Specifically, first local access network 520 may include a low-powered wireless network such as, for example, a 6lowPAN network, a ZIGBEE network, a DASH7 network, and/or a BLUETOOTH network. Further, second local access network 540 may include a high-powered wireless network, such as an IEEE 802.11 network (Wi-Fi), a WiMAX network, and/or a cellular network (e.g., LTE). In some aspects, however, first local access network 520 and second local access area network 540 may include any suitable wired or wireless network.

Figure 6A:
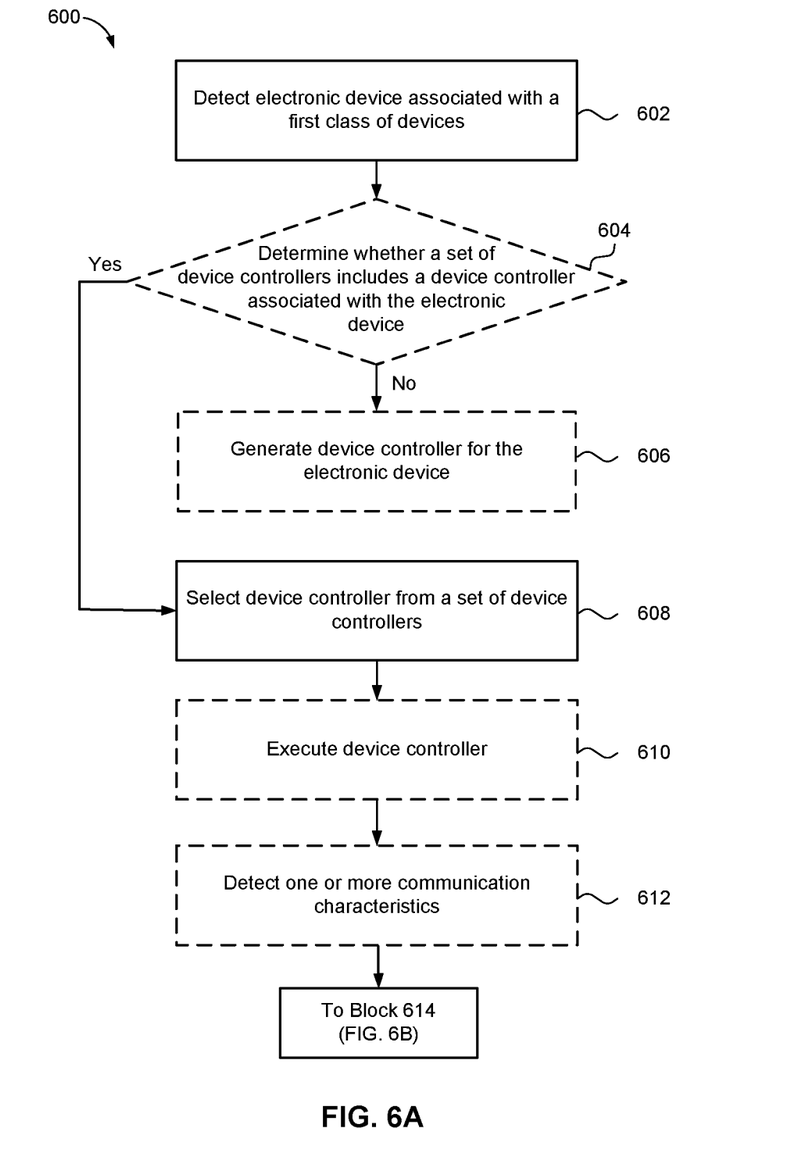
FIGS. 6A and 6B are flow diagrams of a method of configuring a network access system in accordance with some aspects of the present disclosure.
Figure 6B:
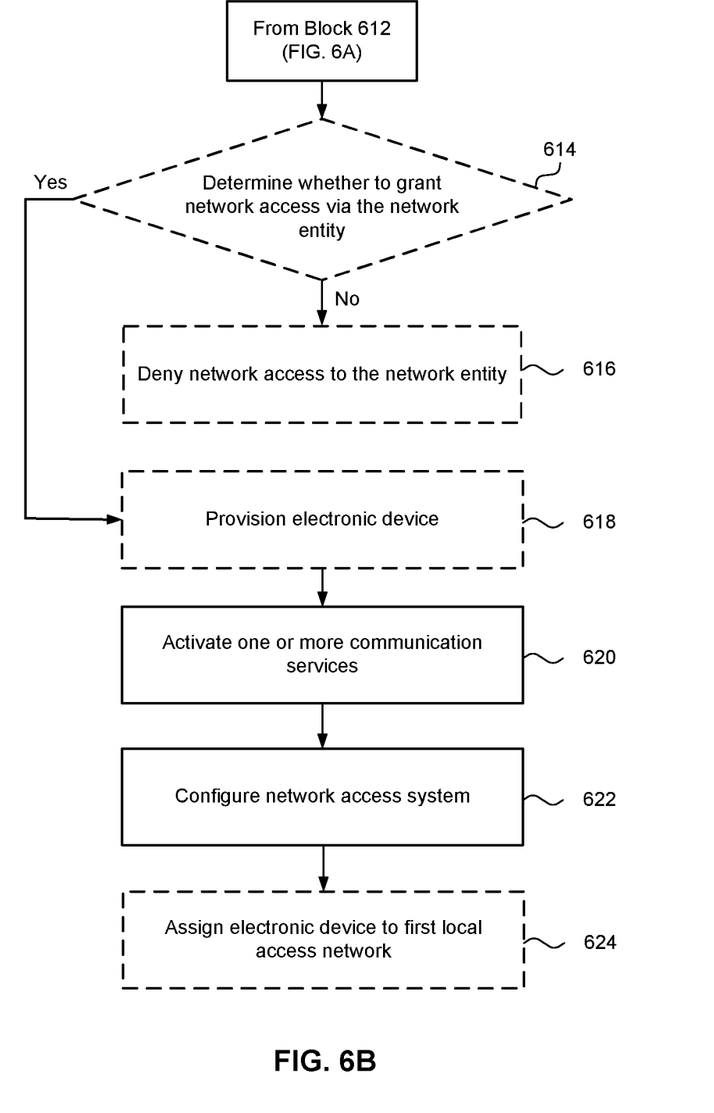

FIGS. 6A and 6B are flow diagrams of method 600 for configuring a network access system in accordance with some aspects of the present disclosure. In some aspects, method 600 may be performed at network entity 102 (FIGS. 1-3 and 5) in accordance with one or more device controllers (e.g., FIGS. 3 and 4) and as part of a communication system 100 (FIG. 1) and/or 500 (FIG. 5). Some operations in method 600 may be combined, the order of some operations may be changed, and some operations may be omitted.

At block 602, method 600 may detect an electronic device associated with a first class of devices. For example, network entity 102 (FIGS. 1-3 and 5) may be configured to execute one or more components, subcomponents, and/or modules (e.g., of FIG. 2) to detect an electronic device (e.g., one or more of automation devices 110, 112, and/or 114, FIGS. 1 and 5) associated with a first class of devices (e.g., automation or Internet-of-things devices).

In some aspects, detecting the electronic device associated with the first class of devices at block 602 may include detecting based on a discovery service protocol. Further, at block 602, method 600 may detect two or more electronic devices associated with or part of the first class of devices. Additionally, in some aspects, the first class of devices is associated with a first local access network different from a second local access network providing access to a second class of devices.

At block 604, method 600 may determine whether a set of device controllers includes a device controller associated with the electronic device. For instance, in response to detecting the electronic device associated with the first class of devices, network entity 102 (FIGS. 1-3 and 5) may be configured to execute one or more components, subcomponents, and/or modules (e.g., of FIG. 2) to determine whether a set of device controllers (e.g., device controllers 302, 308, and/or 314, FIG. 3) includes a device controller (e.g., first device controller 302, FIGS. 3 and 4) associated with the electronic device (e.g., one or more of automation devices 110, 112, and/or 114, FIGS. 1 and 5).

In some aspects, at block 606, method 600 may optionally generate the device controller for the electronic device in accordance with a determination that the set of device controllers does not include the device controller associated with the electronic device. For example, in accordance with a determination that the set of device controllers (e.g., device controllers 302, 308, and/or 314, FIG. 3) does not include the device controller associated with the electronic device (e.g., one or more of automation devices 110, 112, and/or 114), network entity 102 (FIGS. 1-3 and 5) may be configured to execute one or more components, subcomponents, and/or modules (e.g., of FIG. 2) to generate the device controller (e.g., first device controller 302, FIGS. 3 and 4) for the electronic device.

Otherwise, method 600, at block 608 may select a device controller from a set of device controllers. For instance, network entity 102 (FIGS. 1-3 and 5) may be configured to execute one or more components, subcomponents, and/or modules (e.g., of FIG. 2) to select a device controller from a set of device controllers (e.g., device controllers 302, 308, and/or 314, FIG. 3) in accordance with a determination that the set of device controllers includes the device controller (e.g., first device controller 302, FIGS. 3 and 4) associated with the electronic device (e.g., one or more of automation devices 110, 112, and/or 114, FIGS. 1 and 5) and/or based at least in part on detecting the electronic device.

In some aspects, the device controller (e.g., first device controller 302, FIGS. 3 and 4) is associated with the electronic device and manages communication between the electronic device (e.g., one or more of automation devices 110, 112, and/or 114, FIG. 1) and a remote host device (e.g., first host device 104 and/or second host device 106, FIGS. 1 and 5).

At block 610, method 600 may optionally execute the device controller associated with the electronic device. For example, network entity 102 (FIGS. 1-3 and 5) may be configured to execute one or more components, subcomponents, and/or modules (e.g., of FIG. 2) to execute the device controller (e.g., first device controller 302, FIGS. 3 and 4) associated with the electronic device (e.g., one or more of automation devices 110, 112, and/or 114, FIGS. 1 and 5).

At block 612, method 600 may optionally detect one or more communication characteristics. For example, network entity 102 (FIGS. 1-3 and 5) may be configured to execute one or more components, subcomponents, and/or modules (e.g., of FIG. 2) to detect one or more communication characteristics in response to executing the device controller (e.g., first device controller 302, FIGS. 3 and 4) associated with the electronic device. In some aspects, detecting the one or more communication characteristics includes querying the electronic device (e.g., one or more of automation devices 110, 112, and/or 114, FIGS. 1 and 5) for one or more device capabilities, a firmware version, and/or one or more service requests.

At block 614, method 600 may optionally determine whether to grant network access via the network entity. For instance, network entity 102 (FIGS. 1-3 and 5) may be configured to execute one or more components, subcomponents, and/or modules (e.g., of FIG. 2) to determine whether to grant network access via network entity 102 (FIGS. 1-3 and 5) to electronic device (e.g., one or more of automation devices 110, 112, and/or 114, FIGS. 1 and 5). In some aspects, the aforementioned determination may be made in response to detecting the electronic device (e.g., at block 602) or selecting device controller (e.g., first device controller 302, FIGS. 3 and 4) from the set of device controllers (e.g., at block 608). Further, for example, the aforementioned determination may include determining, via an application module, whether to grant network access via the network entity 102 (FIGS. 1-3 and 5).

In some aspects, determining whether to grant network access to the network entity 102 (FIGS. 1-3 and 5) includes determining whether an identifier of the electronic device (e.g., one or more of automation devices 110, 112, and/or 114, FIGS. 1 and 5) matches a stored identifier at and/or known by the network entity 102 (FIGS. 1-3 and 5). Further, based on determining that the identifier of the electronic device (e.g., one or more of automation devices 110, 112, and/or 114, FIGS. 1 and 5) does not match the stored identifier at the network entity 102 (FIGS. 1-3 and 5), a device access indication may be sent to a user device (e.g., electronic device 116, FIG. 1 and/or electronic device 530, FIG. 5).

Additionally, in response to sending the device access indication to the user device (e.g., electronic device 116, FIG. 1 and/or electronic device 530, FIG. 5), the network entity 102 (FIGS. 1-3 and 5) may receive an access authorization indication from the user device. In some aspects, the access authorization indication permits network access for the electronic device (e.g., one or more of automation devices 110, 112, and/or 114, FIGS. 1 and 5) at the network entity 102 (FIGS. 1-3 and 5). In some aspects, the identifier of the electronic device may be one or more of a mobile number, a telephone number, an International Mobile Equipment Identity (IMEI), an International Mobile Subscriber Identity (IMSI), a serial number, an Integrated Circuit Card Identifier (ICCID), or a mobile equipment identifier (MEID).

In some aspects, at block 616, method 600 may optionally deny network access to the network entity based on receiving an access denial indication from the user device. Otherwise, at block 618, method 600 may optionally provision the electronic device in response to receiving the access authorization indication. For example, network entity 102 (FIGS. 1-3 and 5) may be configured to execute one or more components, subcomponents, and/or modules (e.g., of FIG. 2) to provision the electronic device (e.g., one or more of automation devices 110, 112, and/or 114, FIGS. 1 and 5) in response to receiving the access authorization indication.

Further, at block 620, method 600 may activate the one or more communication services. For instance, network entity 102 (FIGS. 1-3 and 5) may be configured to execute one or more components, subcomponents, and/or modules (e.g., of FIG. 2) to activate the one or more communication services (e.g., one or more facades 304 and 306, FIGS. 3 and 4), for example, in response to selecting the device controller (e.g., first device controller 302, FIGS. 3 and 4) from the set of device controllers (e.g., device controllers 302, 308, and/or 314, FIG. 3).

In some aspects, each of the one or more communication services implements a facade or pattern of usage (e.g., one or more facades 304 and 306, FIGS. 3 and 4) that specifies one or more of a device capability characteristics (e.g., of one or more of automation devices) or one or more network services (e.g., of one or more of automation devices 110, 112, and/or 114, FIGS. 1 and 5). For example, the one or more communication services, or more specifically, the one or more network services include one or both of a remote server service (e.g., first facade 304, FIGS. 3 and 4) that specifies one or more remote hosts or ports of the remote host device and/or a local access service (e.g., second facade 306, FIGS. 3 and 4) that specifies one or more local access network communication characteristics of the network entity 102 (FIGS. 1-3 and 5).

At block 622, method 600 may configure a network access system at the network entity based on the one or more communication services. For example, network entity 102 (FIGS. 1-3 and 5) may be configured to execute one or more components, subcomponents, and/or modules (e.g., of FIG. 2) to configure one or more network access characteristics (e.g., one or more rules, parameters, and/or operational characteristics) of a network access system 120 (FIGS. 1-3 and 5) at the network entity 102 (FIGS. 1-3 and 5) based on the one or more communication services (e.g., one or more facades 304 and 306, FIGS. 3 and 4).

In some aspects, configuring the network access system 120 (FIGS. 1-3 and 5) includes adjusting (e.g., permitting) outbound communication from the electronic device (e.g., one or more of automation devices 110, 112, and/or 114, FIGS. 1 and 5) to the remote host device (e.g., first host device 104 and/or second host device 106, FIGS. 1 and 5) according to one or both of the remote server (e.g., first facade 304, FIGS. 3 and 4) service or the local access service (e.g., second facade 306, FIGS. 3 and 4).

Further, in some aspects, configuring the network access system 120 (FIGS. 1-3 and 5) includes adjusting a whitelist or blacklist to include or exclude, respectively, one or both of the remote server service (e.g., first facade 304, FIGS. 3 and 4) or the local access service (e.g., second facade 306, FIGS. 3 and 4). For instance, a whitelist permits one or both of inbound or outbound communication between the electronic device (e.g., one or more of automation devices 110, 112, and/or 114, FIGS. 1 and 5) and one or more remote host devices (e.g., first host device 104 and/or second host device 106, FIGS. 1 and 5), whereas a blacklist prevents one or both of inbound or outbound communication between the electronic device and the one or more remote host devices.

Additionally, in some aspects, configuring the network access system 120 (FIGS. 1-3 and 5) includes restricting communication to one or more destination addresses of a remote host device (e.g., first host device 104 and/or second host device 106, FIGS. 1 and 5) and/or on one or more outbound ports at the network entity 102 (FIGS. 1-3 and 5) in response to activating the one or more communication services (e.g., one or more facades 304 and 306, FIGS. 3 and 4).

In some aspects, configuring the network access system 120 (FIGS. 1-3 and 5) at the network entity 102 (FIGS. 1-3 and 5) includes configuring one or more network access characteristics (e.g., one or more rules, parameters, and/or operational characteristics) of the network access system from a first set of network access characteristics to a second set of network access characteristics based on the one or more communication services (e.g., one or more facades 304 and 306, FIGS. 3 and 4).

In some aspects, configuring the network access system 120 (FIGS. 1-3 and 5) at the network entity 102 (FIGS. 1-3 and 5) includes a kernel module configured to modify a kernel according to the one or more communication services (e.g., one or more facades 304 and 306, FIGS. 3 and 4).

At block 624, method 600 may assign the electronic device associated with the first class of devices to the first local access network. For instance, network entity 102 (FIGS. 1-3 and 5) may be configured to execute one or more components, subcomponents, and/or modules (e.g., of FIG. 2) to assign the electronic device (e.g., one or more of automation devices 110, 112, and/or 114, FIGS. 1 and 5) associated with the first class of devices to the first local access network (e.g., device LAN 520, FIG. 5).

Figure 7:
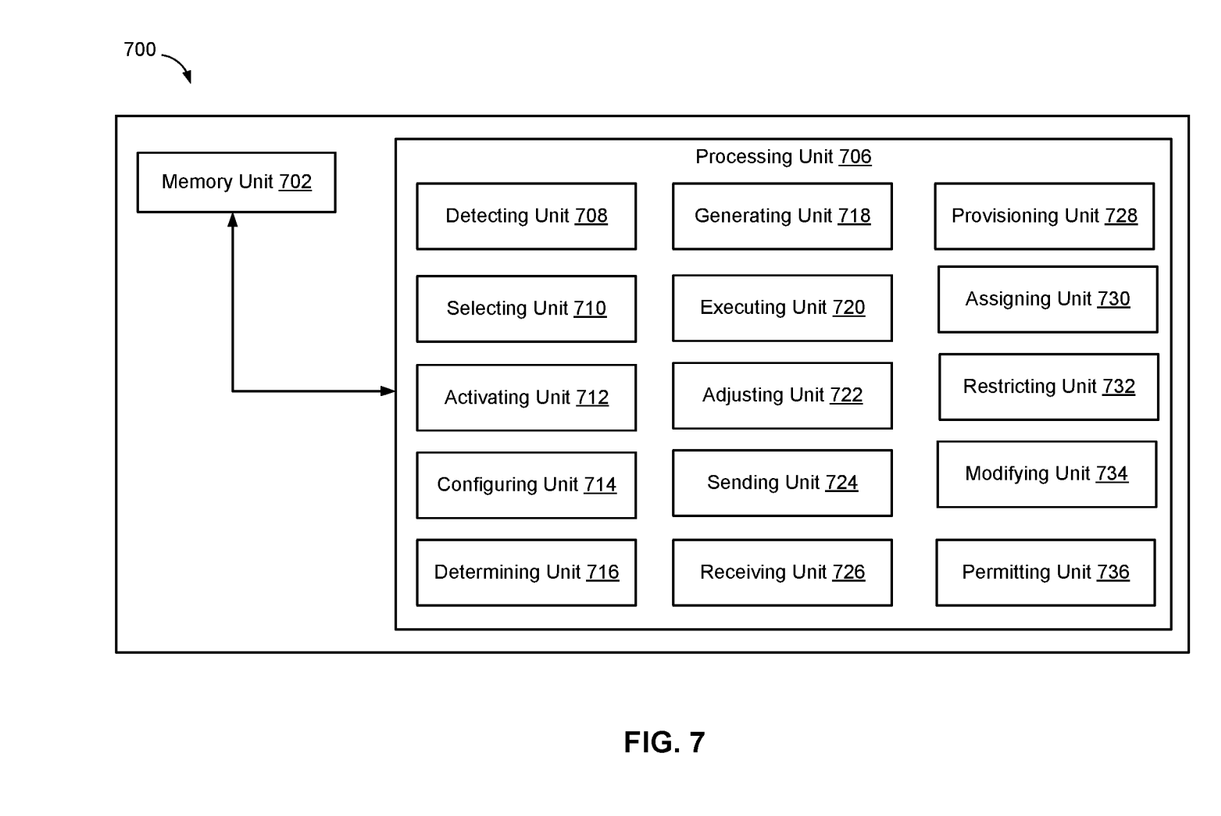
FIG. 7 illustrates a functional block diagram of a network entity in accordance with some aspects of the present disclosure.

FIG. 7 illustrates a functional block diagram of a network entity in accordance with some aspects of the present disclosure. As shown in FIG. 7, an electronic device 700, which may be the same as or similar to network entity 102 (FIGS. 1-3 and 5) includes memory unit 702, which may be configured to store data for retrieval, and processing unit 704 coupled to the memory unit 702. In some aspects, processing unit 704 includes detecting unit 708, selecting unit 710, activating unit 712, configuring unit 714, determining unit 716, generating unit 718, executing unit 720, adjusting unit 722, sending unit 724, receiving unit 726, assigning unit 730, restricting unit 732, and modifying unit 734.

Processing unit 704 may be configured to detect (e.g., using or via detecting unit 708) an electronic device associated with a first class of devices; select (e.g., using or via selecting unit 710) a device controller from a set of device controllers based at least in part on detecting the electronic device, wherein the device controller is associated with the electronic device and manages communication between the network entity and the electronic device according to one or more communication services; activate (e.g., using or via activating unit 712) the one or more communication services in response to selecting the device controller from the set of device controllers; and configure (e.g., using or via configuring unit 714) a network access system at the network entity based on the one or more communication services.

In some aspects, processing unit 704 may further be configured to determine (e.g., using or via determining unit 716) whether the set of device controllers includes the device controller associated with the electronic device; and generate (e.g., using or via generating unit 718) the device controller for the electronic device in accordance with a determination that the set of device controllers does not include the device controller associated with the electronic device, wherein to select the device controller, processing unit 704 may further be configured to select (e.g., using or via selecting unit 710) the device controller from the set of device controllers in accordance with a determination that the set of device controllers includes the device controller associated with the electronic device.

In some aspects, to select the device controller from the set of device controllers, the processing unit 704 may further be configured to executing (e.g., using or via executing unit 720) at the network entity, the device controller associated with the electronic device.

In some aspects, processing unit 704 may further be configured to detect (e.g., using or via detecting unit 708) one or more communication characteristics in response to executing the device controller associated with the electronic device.

In some aspects, each of the one or more communication services implements a facade or pattern of usage that specifies one or more of a device capability characteristics or one or more network services.

In some aspects, the one or more communication services or the one or more network services include one or both of: a remote server service that specifies one or more remote hosts or ports of the remote host device; or a local access service that specifies one or more local access network communication characteristics of the network entity.

In some aspects, to configure the network access system, processing unit 704 may be further configured to adjust (e.g., using or via adjusting unit 722) outbound communication from the electronic device to the remote host device according to one or both of the remote server service or the local access service.

In some aspects, to configure the network access system, processing unit 704 may further be configured to adjust (e.g., using or via adjusting unit 722) a whitelist or blacklist to include or exclude one or both of the remote server service or the local access service.

In some aspects, to configure the network access system, processing unit 704 may further be configured to adjust (e.g., using or via adjusting unit 722) a blacklist to exclude one or both of the remote server service or the local access service.

In some aspects, to detect the electronic device associated with the first class of devices, processing unit 704 may further be configured to detect (e.g., using or via detecting unit 708) based on a discovery service protocol.

In some aspects, processing unit 704 may further be configured to determine (e.g., using or via determining unit 716) whether to grant network access via the network entity in response to detecting the electronic device.

In some aspects, to determine whether to grant network access to the network entity, processing unit 704 may further be configured to: determine (e.g., using or via determining unit 716) whether an identifier of the electronic device matches a stored identifier known by the network entity; send (e.g., using or via sending unit 724) a device access indication to a user device based on determining that the identifier of the electronic device does not match the stored identifier at the network entity; and receive (e.g., using or via receiving unit 726) an access authorization indication from the user device in response to sending the device access indication.

In some aspects, processing unit 704 may further be configured to provision (e.g., using or via provisioning unit 728) the electronic device in response to receiving the access authorization indication.

In some aspects, the first class of devices is associated with a first local access network different from a second local access network providing access to a second class of devices, processing unit 704 may further be configured to assign (e.g., using or via assigning unit 730) the electronic device associated with the first class of devices to the first local access network.

In some aspects, to configure the network access system, processing unit 704 may further be configured to restrict (e.g., using or via restricting unit 732) communication on one or more outbound ports at the network entity in response to activating the one or more communication services.

In some aspects, to configure the network access system at the network entity, processing unit 704 may further be configured to configure (e.g., using or via configuring unit 714) one or more network access characteristics of the network access system from a first set of network access characteristics to a second set of network access characteristics based on the one or more communication services.

In some aspects, to configure the network access system at the network entity, processing unit 704 may further be configured to modify (e.g., using or via modifying unit 734) a kernel according to the one or more communication services.

In some aspects, the network entity is a router. In some aspects, the electronic device is one of a lighting control device, a lighting device, a thermostat device, a shading device, a wearable electronic sensor, a security device, an image capturing device, a recording device, an appliance, voice command device, or an entertainment device. In some aspects, the network access system is a network firewall. In some aspects, the network access system is a network access point. In some aspects, the network access system is an industrial gateway or commercial base station.

As used herein, the term "determining" encompasses a wide variety of actions. For example, "determining" may include calculating, computing, processing, deriving, investigating, looking up (e.g., looking up in a table, a database or another data structure), and/or ascertaining. Also, "determining" may include receiving (e.g., receiving information), accessing (e.g., accessing data in a memory) and the like. Also, "determining" may include resolving, selecting, choosing, and/or establishing.

It should be understood that the claims are not limited to the precise configuration and components illustrated above. Various modifications, changes and variations may be made in the arrangement, operation and details of the methods and apparatus described above without departing from the scope of the claims. While the foregoing is directed to aspects of the present disclosure, other and further aspects of the disclosure may be devised without departing from the basic scope thereof, and the scope thereof is determined by the claims that follow.

What is claimed is:

1. A method, comprising:
    detecting, at a network entity, an electronic device comprising an Internet-of-Things (IoT) device implemented for operation and usage in an IoT network, wherein the operation and usage includes at least a particular automation capability defined via an IoT usage characteristic;
    selecting, at the network entity, a device controller from a plurality of device controllers based, at least in part, on detecting that the device controller is capable of implementing the particular automation capability of the electronic device in the IoT network, wherein the device controller is associated with the electronic device and is operable to:
       control the operation and usage of the electronic device in the IoT network; and
       manage communication between the electronic device and a remote host device according to one or more communication services, wherein the communication includes transmitting and receiving operating instructions specific to the particular automation capability;
    activating the one or more communication services between the electronic device and the remote host in response to selecting the device controller from the plurality of device controllers; and
    configuring a network access system at the network entity based, at least in part, on the one or more communication services.

2. The method of claim 1, wherein the one or more communication services include one or both of:
    a remote server service that specifies one or more remote hosts or ports of the remote host device; or
    a local access service that specifies one or more local access network communication characteristics of the network entity.

3. The method of claim 2, wherein configuring the network access system includes adjusting outbound communication from the electronic device to the remote host device according to one or both of the remote server service or the local access service.

4. The method of claim 2, wherein configuring the network access system includes adjusting a whitelist to include one or both of the remote server service or the local access service.

5. The method of claim 2, wherein configuring the network access system includes adjusting a blacklist to exclude one or both of the remote server service or the local access service.

6. The method of claim 1, further comprising:
    determining whether the plurality of device controllers includes the device controller capable of controlling the operation and usage of the electronic device in the IoT network; and
    generating the device controller for the electronic device in accordance with a determination that the plurality of device controllers does not include the device controller capable of controlling the operation and usage of the electronic device in the IoT network,
    wherein selecting the device controller includes selecting the device controller from the plurality of device controllers in accordance with a determination that the plurality of device controllers includes the device controller capable of controlling the operation and usage of the electronic device in the IoT network.

7. The method of claim 1, wherein selecting the device controller from the plurality of device controllers includes executing, at the network entity, the device controller associated with the electronic device.

8. The method of claim 7, further comprising detecting one or more communication characteristics in response to executing the device controller to control the operation and usage of the electronic device in the IoT network.

9. The method of claim 1, wherein detecting the electronic device includes detecting based, at least in part, on a discovery service protocol.

10. The method of claim 1, further comprising determining, via an application module, whether to grant network access via the network entity in response to detecting the electronic device.

11. The method of claim 10, wherein determining whether to grant network access via the network entity includes:
determining whether an identifier of the electronic device matches a stored identifier known by the network entity;
sending a device access indication to a user device based on determining that the identifier of the electronic device does not match the stored identifier at the network entity; and
receiving an access authorization indication from the user device in response to sending the device access indication.

12. The method of claim 11, further comprising provisioning the electronic device in response to receiving the access authorization indication.

13. The method of claim 1,
wherein the electronic device is associated with a first class of devices comprising a plurality of IoT devices, wherein a particular one of the plurality of device controllers is associated with a respective one of the first class of devices,
wherein the first class of devices is associated with a first local access network different from a second local access network providing access to a second class of devices comprising a plurality of user devices operating according to user control, and
wherein the method further comprises assigning the electronic device associated with the first class of devices to the first local access network.

14. The method of claim 1, wherein configuring the network access system includes restricting communication on one or more outbound ports at the network entity in response to activating the one or more communication services.

15. The method of claim 1, wherein configuring the network access system at the network entity includes configuring one or more network access characteristics of the network access system from a first set of network access characteristics to a second set of network access characteristics based on the one or more communication services.

16. The method of claim 1, wherein configuring the network access system at the network entity includes modifying a kernel according to the one or more communication services.

17. The method of claim 1, wherein the network entity comprises a router.

18. The method of claim 1, wherein the electronic device comprises at least one of the following: a lighting control device, a thermostat device, a shading device, a wearable electronic sensor, a security device, an image capturing device, a recording device, an appliance, voice command device, or an entertainment device, or any combination thereof.

19. The method of claim 1, wherein the network access system comprises at least one of the following: a network firewall; a network access point; an industrial gateway; or a commercial base station; or any combination thereof.

20. A non-transitory computer-readable storage medium comprising one or more programs for execution by one or more processors of a network entity, the one or more programs including instructions to:
detect, at the network entity, an electronic device to comprise an Internet-of-Things (IoT) device implemented for operation and usage in an IoT network, the operation and usage to include at least a particular automation capability defined via an IoT usage characteristic;
select, at the network entity, a device controller from a plurality of device controllers based, at least in part, on a detection that the device controller is capable to implement the particular automation capability of the electronic device in the IoT network, wherein the device controller is associated with the electronic device and is operable to:
control the operation and usage of the electronic device in the IoT network; and
manage communication between the electronic device and a remote host device according to one or more communication services, wherein the communication includes a transmission and receipt of operating instructions specific to the particular automation capability;
activate the one or more communication services between the electronic device and the remote host in response to the selection of the device controller from the plurality of device controllers; and
configure a network access system at the network entity based, at least in part, on the one or more communication services.

21. A network entity comprising:
one or more processors;
a memory coupled to the one or more processors; and
one or more programs stored in the memory, the one or more programs including instructions executable by the one or more processors to:
detect, at the network entity, an electronic device to comprise an Internet-of-Things (IoT) device implemented for operation and usage in an IoT network, the operation and usage to include at least a particular automation capability defined via an IoT usage characteristic;
select, at the network entity, a device controller from a plurality of device controllers based, at least in part, on a detection that the device controller is capable to implement the particular automation capability of the electronic device in the IoT network, wherein the device controller is associated with the electronic device and is operable to:
control the operation and usage of the electronic device in the IoT network; and
manage communication between the electronic device and a remote host device according to one or more communication services, wherein the communication includes a transmission and receipt of operating instructions specific to the particular automation capability;
activate the one or more communication services between the electronic device and the remote host in response to selecting the device controller from the plurality of device controllers; and
configure a network access system at the network entity based, at least in part, on the one or more communication services.

22. The method of claim 1, wherein the particular automation capability of the electronic device is implemented via one or more facades.

23. The method of claim 1, wherein detecting includes querying the electronic device for the particular automation capability.

* * * * *